United States Patent
Li et al.

(10) Patent No.: US 12,399,859 B2
(45) Date of Patent: Aug. 26, 2025

(54) INTER-PROCESSOR COMMUNICATION METHOD, ELECTRONIC ASSEMBLY, AND ELECTRONIC DEVICE

(71) Applicant: GUANGDONG OPPO MOBILE TELECOMMUNICATIONS CORP., LTD., Guangdong (CN)

(72) Inventors: Dingyi Li, Guangdong (CN); Libin Zhou, Guangdong (CN); Liang Wang, Guangdong (CN); Jinze Gao, Guangdong (CN); Jianhui Huang, Guangdong (CN); Qiming Li, Guangdong (CN); Wei Su, Guangdong (CN)

(73) Assignee: GUANGDONG OPPO MOBILE TELECOMMUNICATIONS CORP., LTD., Guangdong (CN)

( * ) Notice: Subject to any disclaimer, the term of this patent is extended or adjusted under 35 U.S.C. 154(b) by 288 days.

(21) Appl. No.: 18/148,417

(22) Filed: Dec. 29, 2022

(65) Prior Publication Data
US 2023/0140279 A1    May 4, 2023

Related U.S. Application Data

(63) Continuation of application No. PCT/CN2021/097310, filed on May 31, 2021.

(30) Foreign Application Priority Data

Aug. 18, 2020  (CN) .......................... 202010832873.4

(51) Int. Cl.
    *G06F 15/17*    (2006.01)
(52) U.S. Cl.
    CPC .................... *G06F 15/17* (2013.01)

(58) Field of Classification Search
    CPC ...................................................... G06F 15/17
    See application file for complete search history.

(56) References Cited

U.S. PATENT DOCUMENTS

| | | | | |
|---|---|---|---|---|
| 4,787,028 A | * | 11/1988 | Finfrock | G06F 13/385 709/222 |
| 10,346,839 B2 | * | 7/2019 | Ovick | G06F 16/283 |

(Continued)

FOREIGN PATENT DOCUMENTS

| | | |
|---|---|---|
| CN | 1783044 | 6/2006 |
| CN | 101788973 A | 7/2010 |

(Continued)

OTHER PUBLICATIONS

EPO, Extended European Search Report issued for EP Patent Application No. 21857277.4, Nov. 22, 2023.

(Continued)

*Primary Examiner* — Henry Tsai
*Assistant Examiner* — John B Roche
(74) *Attorney, Agent, or Firm* — Hodgson Russ LLP

(57) ABSTRACT

An inter-processor communication method, an electronic assembly, and an electronic device are provided. The electronic device at least includes a first core and a second core. A plurality of communication channels is defined between the first core and the second core. Each of the plurality of communication channels having a communication performance different from each other. The inter-processor communication method includes: acquiring to-be-transmitted data, the to-be-transmitted data is data transmitted between the first core and the second core; acquiring a corresponding communication channel corresponding to the to-be-transmitted data from the plurality of communication channels as a target communication channel; transmitting the to-be-transmitted data via the target communication channel.

20 Claims, 8 Drawing Sheets

(56) References Cited

U.S. PATENT DOCUMENTS

| | | | | |
|---|---|---|---|---|
| 2003/0018714 | A1* | 1/2003 | Mikhailov | H04L 67/02 |
| | | | | 707/E17.107 |
| 2006/0041889 | A1* | 2/2006 | Radulescu | H04L 49/9073 |
| | | | | 719/313 |
| 2006/0095920 | A1 | 5/2006 | Goossens | |
| 2009/0092048 | A1 | 4/2009 | Liang et al. | |
| 2011/0173352 | A1 | 7/2011 | Sela et al. | |
| 2013/0120449 | A1* | 5/2013 | Ihara | G06F 11/0727 |
| | | | | 345/633 |
| 2016/0210255 | A1* | 7/2016 | Wicki | H04L 12/4625 |
| 2016/0378441 | A1 | 12/2016 | Baker et al. | |
| 2017/0041296 | A1* | 2/2017 | Ford | G06F 21/64 |

FOREIGN PATENT DOCUMENTS

| | | |
|---|---|---|
| CN | 101860894 A | 10/2010 |
| CN | 104933009 | 9/2015 |
| CN | 108920392 A | 11/2018 |
| CN | 110647494 A | 1/2020 |
| CN | 110764924 | 2/2020 |
| CN | 111026697 | 4/2020 |
| WO | 2015081490 | 6/2015 |

OTHER PUBLICATIONS

Liu, "Design and Implementation of Heterogeneous Multi core Processor," Master's Thesis of Xidian University, Chinese Excellent Master's Thesis Full Text Database Information Technology Collection, May 2017.

Mittal et al., "A Survey of CPU-GPU Heterogeneous Computing Techniques," ACM Computing Surveys, Jul. 2015, vol. 47, No. 4, article 69.

CNIPA, First Office Action for CN Application No. 202010832873.4, May 11, 2024.

WIPO, International Search Report and Written Opinion for International Application No. PCT/CN2021/097310, Aug. 16, 2021.

Cheng, "ARM Cortex-A8 Hardware Design DIY," Beihang University Press, Oct. 31, 2012.

CNIPA, Second Office Action for CN Application No. 202010832873.4, Sep. 18, 2024.

CNIPA, Notification to Grant Patent Right for Invention for CN Application No. 202010832873.4, Nov. 22, 2024.

EPO, Communication for EP Application No. 21857277.4, Feb. 12, 2025.

* cited by examiner

INTER-PROCESSOR COMMUNICATION METHOD, ELECTRONIC ASSEMBLY, AND ELECTRONIC DEVICE

CROSS REFERENCE TO RELATED APPLICATIONS

The present disclosure is a continuation of International Patent Application No. PCT/CN2021/097310, filed May 31, 2021, which claims priority to Chinese Patent Application No. 202010832873.4, filed Aug. 18, 2020, the entire disclosures of which are incorporated herein by reference.

TECHNICAL FIELD

The present disclosure relates to a field of electronic technologies, in particular to an inter-processor communication method, an electronic assembly, and an electronic device.

BACKGROUND

In electronic devices, a dual core solution is adopted to improve performance and user experience. In some cases, the dual cores of electronic device can communicate with each other to realize some service functions.

SUMMARY

In a first aspect, an inter-processor communication method performed by an electronic device is provided in the present disclosure, and at least includes a first core and a second core, a plurality of communication channels are defined between the first core and the second core, each of the plurality of communication channels has a communication performance different from each other. The method includes: acquiring to-be-transmitted data, the to-be-transmitted data is data transmitted between the first core and the second core; acquiring a corresponding communication channel corresponding to the to-be-transmitted data from the plurality of communication channels as a target communication channel; transmitting the to-be-transmitted data via the target communication channel.

In a second aspect, an electronic assembly is provided in the present disclosure, and includes a first core and a second core, a plurality of communication channels are defined between the first core and the second core, each of the plurality of communication channels has a communication performance different from each other. The first core is configured to: acquire a current data transmission mode; acquire a corresponding communication channel corresponding to the to-be-transmitted data from the plurality of communication channels as a target communication channel; transmit the to-be-transmitted data to the second core via the target communication channel.

In a third aspect, an electronic device is provided in the present disclosure, and include a processor and a memory. one or more programs are stored in the memory and used to be executed by the processor to implement above method.

BRIEF DESCRIPTION OF THE DRAWINGS

In order to clearly describe the technical solution in the embodiments of the present disclosure, the following briefly introduces drawings needed to be used in the description of the embodiments. Apparently, the drawings in the following description are only some embodiments of the present disclosure. For those skilled in the art, other drawings may be acquired according to the drawings without any creative work.

DETAILED DESCRIPTION

Figure 1:
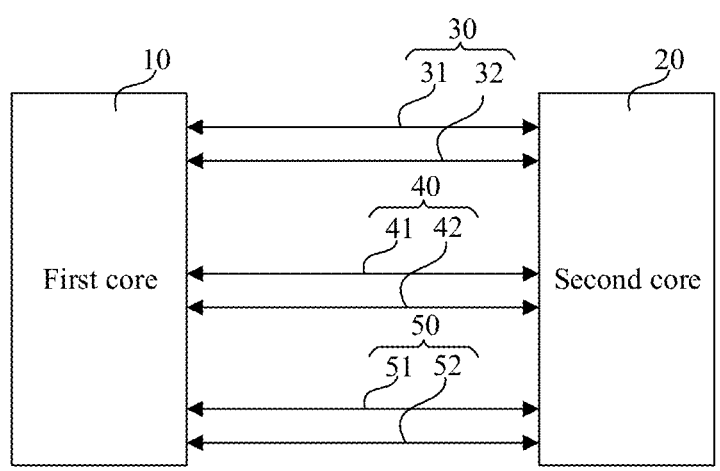
FIG. 1 is a schematic diagram of a multi-core architecture in an electronic device according to an embodiment of the present disclosure.

The technical solutions in the embodiments of the present disclosure is clearly and completely described below in combination with drawings in the embodiments of the present disclosure. Apparently, the embodiments are only some embodiments of the present disclosure, not all of embodiments. Based on the embodiments of the present disclosure, all other embodiments acquired by those skilled in the art without creative work fall into scope of the present disclosure.

With the increasingly rich functions of an electronic device, the amount of data needed to be processed by the electronic device is also increasing. In order to have ability to process more data, the electronic device can be configured with more components for data processing. For example, the data processing can be performed in the electronic device by configuring a multi-core processor. The multi-core processor is a processor in which two or more complete computing engines (cores) are integrated. In this way, the processor can support a plurality of processors on a system bus, and a bus controller provides all bus control signals and command signals. Furthermore, the electronic device can also be configured with a variety of processors for the data processing. For example, CPU and microcontroller unit (MCU) may be configured to process data. It should be noted that during a process of data processing of CPU and MCU, the data needed to be processed can be understood as data processed by a core in the CPU and a core in the MCU. During a process of communication between a corresponding CPU and a corresponding MCU, the core in the corresponding CPU communicates with the core in the corresponding MCU, and the core in the corresponding CPU and the core in the corresponding MCU may all be understood as modules used to process data.

However, after studying data processing scheme of the multi-core processor or the variety of processors in related art, the inventor found that data communication performance between the multi-core processors and the variety of processors is poor and the data processing scheme lacks flexibility. For example, in a case that the electronic device is configured with the variety of processors, only one communication channel is defined between the variety of processors, so that no matter what type of data can only be transmitted via the communication channel, thereby enabling data communication to lack flexibility. In addition, since the only one communication channel is configured to transmit, data a speed, transmission real-time capability and stability of data transmission need to be improved.

Therefore, after studying above problems, the inventor proposes an inter-processor communication method, an apparatus, an electronic assembly, an electronic device, and a storage medium. The electronic device at least may include a first core and a second core, a plurality of communication channels are defined between the first core and the second core. In a case that each of the plurality of communication channels respectively has a communication performance different from each other. After acquiring to-be-transmitted data which transmitted between the first core and the second core, a corresponding communication channel corresponding to the to-be-transmitted data may be selected from the plurality of communication channels and used as a target communication channel, thereby transmitting the to-be-transmitted data via the target communication channel. In this way, when data is need to be transmitted between the first core and the second core, the to-be-transmitted data may be transmitted via the corresponding communication channel corresponding to the data, thereby improving flexibility of a communication method between dual cores.

A hardware architecture of the electronic device provided in the embodiment of the present disclosure is described below.

As shown in FIG. 1, in the architecture of the electronic device shown in FIG. 1, a first core 10 and a second core 20 are shown in an exemplary manner. Communication channel 30, communication channel 40 and communication channel 50 may be defined between the first core 10 and the second core 20.

The communication channel 30 may include data route 31 for data transmission and timing-sequence route 32 for timing-sequence control. Under control of the timing-sequence route 32, both the first core 10 and the second core 20 can actively transmit data based on the data route 31. Optionally, the data route 31 is data route based on a serial peripheral interface (SPI) communication protocol. The communication performance of the communication channel 30 include fast data transmission speed, low power consumption and strong robustness.

A timing-sequence of data transmission based on the communication channel 30 is introduced below through contents shown in FIGS. 2 and 3.

Figure 2:
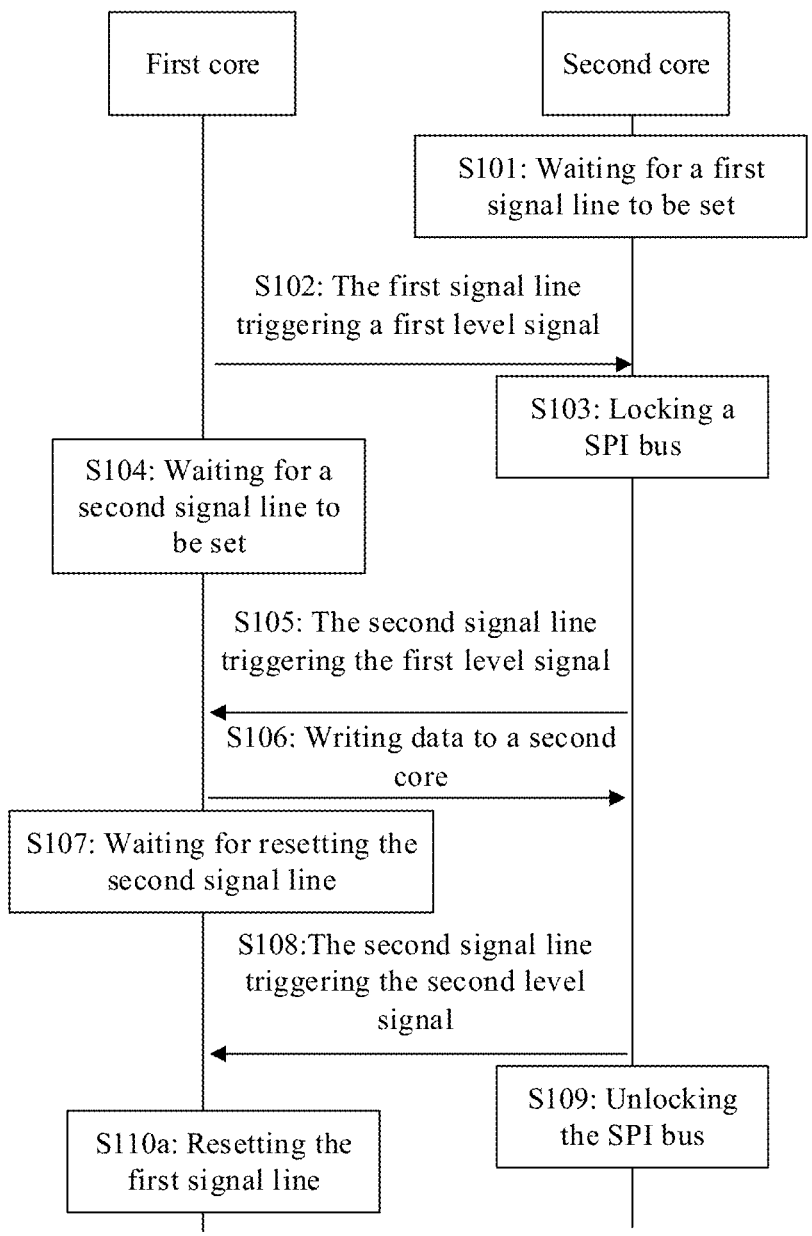
FIG. 2 is a flowchart of a first core actively transmitting data to the second core according to an embodiment of the present disclosure.

As shown in FIG. 2, FIG. 2 is a timing-sequence of the first core 10 actively transmitting data to the second core 20. The timing-sequence may include following operations.

Operation S101 includes: waiting for a first signal line to be set.

Operation S102 includes: the first signal line triggering a first level signal.

Operation S103 includes: locking a SPI bus.

Operation S104 includes: waiting for a second signal line to be set.

Operation S105 includes: the second signal line triggering the first level signal.

Operation S106 includes: writing data to a second core.

Operation S107 includes: waiting for resetting the second signal line.

Operation S108 includes: the second signal line triggering the second level signal.

Operation S109 includes: unlocking the SPI bus.

Operation S110a includes: resetting the first signal line.

Figure 3:
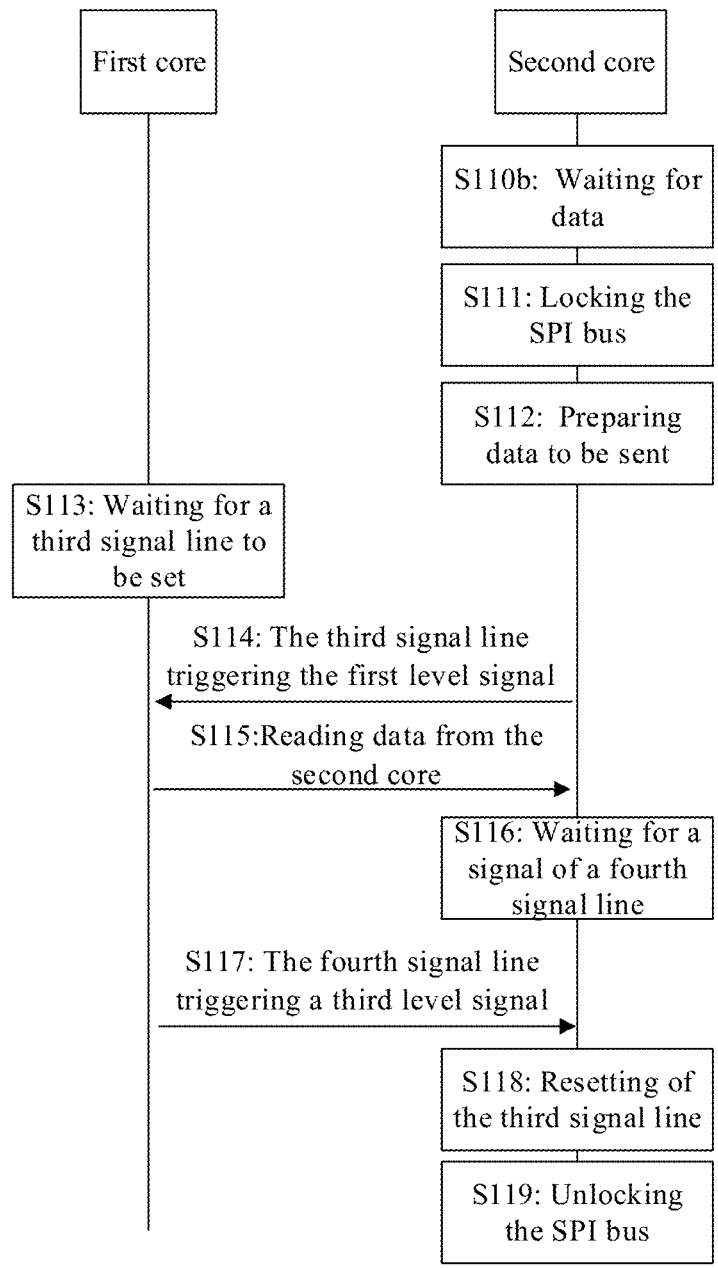
FIG. 3 is a flowchart of a first core actively reading data from the second core according to an embodiment of the present disclosure.

As shown in FIG. 3, FIG. 3 is a timing-sequence of the second core 20 actively transmitting data to the first core 10. The timing-sequence may include following operations.

Operation S110b includes: waiting for data.

Operation S111 includes: locking the SPI bus.

Operation S112 includes: preparing data to be sent.

Operation S113 includes: waiting for a third signal line to be set.

Operation S114 includes: the third signal line triggering the first level signal.

Operation S115 includes: reading data from the second core.

Operation S116 includes: waiting for a signal of a fourth signal line.

Operation S117 includes: the fourth signal line triggering a third level signal.

Operation S118 includes: resetting of the third signal line.

Operation S119 includes: unlocking the SPI bus.

It should be noted that the timing-sequence route 32 may include the first signal line, the second signal line, the third signal line and the fourth signal line. The first level signal may be a rising edge signal, the second level signal may be a falling edge signal, and the third level signal may be the high-level signal.

The communication channel 40 may include data route 41 for data transmission and flow-control-route 42 for flow control. The flow-control-route 42 may be used to control a start and a stop of data transmission in the data route 41. Optionally, the data route 41 may be data route based on a Universal Asynchronous Receiver/Transmitter protocol. The communication performance of communication channel 40 is good in transmission real-time capability and stable in transmission.

The communication channel 50 may include data route 51 configured to request work state of the second core 20 and register state of the second core 20 by the first core 10, and data route 52 configured to output log data to the first core 10 by the second core 20. Optionally, the data route 51 may be data route based on the serial wire debug (SWD) communication protocol. In this way, the data route 51 may include a serial wire data input output (SWDIO) data route and a serial wire clock (SWCLK) clock line.

It should be noted that the architecture shown in FIG. 1 is only exemplary. In addition to the first core 10 and the second core 20 in FIG. 1, the electronic device may also include more cores, and communication channels between the more cores may also be defined in the way shown in FIG. 1. Furthermore, communication channels between the first core 10 and the second core 20 may also include some communication channels in the communication channel 30, communication channel 40 and communication channel 50. For example, the communication channels between the first core 10 and the second core 20 may only include communication channel 30 and communication channel 40. In this case, data originally transmitted in the communication channel 50 may be transmitted in the communication channel 30 and/or communication channel 40. For another example, the communication channels between the first core 10 and the second core 20 may only include communication channel 30 and communication channel 50. In this case, data originally transmitted in the communication channel 40 may be transmitted in communication channel 30 and/or communication channel 50.

Furthermore, it should be noted that the first core 10 and the second core 20 may be arranged in a same processor or different processors. For example, the first core 10 may be a core (for example, CPU) that carries an operation system (for example, Android), and the second core 20 may be a core (for example, MCU) that carries sensor data.

A communication architecture provided in the embodiments of the present disclosure is introduced below.

Figure 4:
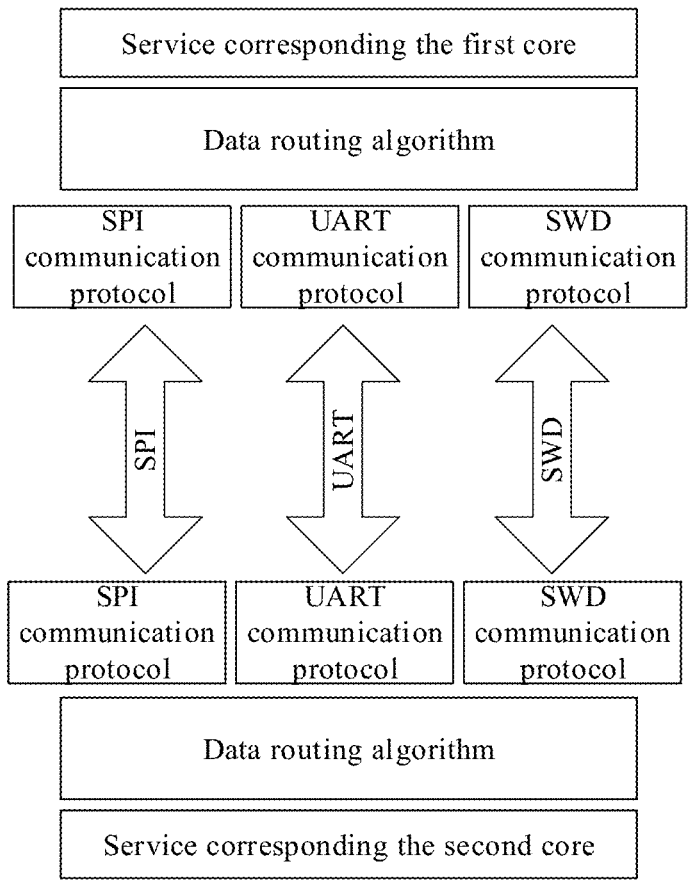
FIG. 4 is a schematic diagram of a communication architecture in an electronic device according to an embodiment of the present disclosure.

As shown in FIG. 4, a service corresponding the first core in the communication architecture shown in FIG. 4 may generate data needed to be transmitted, and the data may be used as to-be-transmitted data. A protocol from subsequent a SPI communication protocol, a UART communication protocol and a SWD communication protocol may be selected, via data routing algorithm, as a protocol to transmit the to-be-transmitted data. Similarly, a service corresponding the second core may also generate data needed to be transmitted, and the data may be used as to-be-transmitted data. A protocol determined through above manner may be selected as a protocol to transmit the to-be-transmitted data. It should be noted that the plurality of aforementioned communication channels are implemented based on different communication protocols, so selecting a protocol here may be understood as selecting a target communication channel for the to-be-transmitted data.

It should be noted that the SPI communication protocol in FIG. 4 may be understood as a SPI communication protocol that the timing-sequence route 32 in FIG. 1 is added to a control route corresponding to the SPI communication protocol in FIG. 4.

The embodiments of the present disclosure are described in detail below in combination with the drawings.

Figure 5:
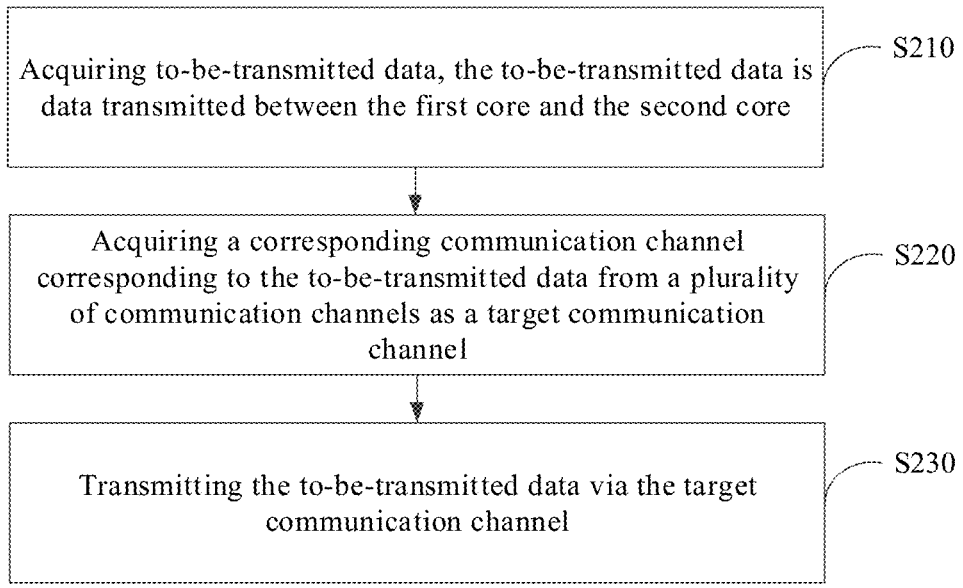
FIG. 5 is a first flowchart of an inter-processor communication method according to an embodiment of the present disclosure.

As shown in FIG. 5, an inter-processor communication method provided in the embodiment of the present disclosure may be applied to the electronic device. The electronic device may at least include a first core and a second core. A plurality of communication channels may be defined between the first core and the second core, and communication performance of each of the plurality of communication channels may be have a communication performance different from each other. The method may include following operations.

Operation S210 may include: acquiring to-be-transmitted data, the to-be-transmitted data is data transmitted between the first core and the second core.

It should be noted that the to-be-transmitted data in this embodiment is data transmitted between the first core and the second core. Optionally, when the method provided in this embodiment is implemented by the first core, the to-be-transmitted data is data transmitted by the first core to the second core. When the method provided in this embodiment is implemented by the second core, the to-be-transmitted data is data transmitted by the second core to the first core.

The to-be-transmitted data may be data generated by a service layer. For example, in response to a firmware required by the second core being transmitted from the first core to the second core, the to-be-transmitted data may be the firmware. In addition, the to-be-transmitted data may also be a control instruction or state reply data, etc.

Operation S220 may include: acquiring a corresponding communication channel corresponding to the to-be-transmitted data from a plurality of communication channels as a target communication channel.

A plurality of communication channels may be defined between the first core and the second core as shown above, and each of the plurality of communication channels may have a communication performance different from each other. Further, after acquiring the to-be-transmitted data, at least one communication channel may be selected from the plurality of communication channels as the corresponding communication channel corresponding to the to-be-transmitted data. The communication performance in the embodiments of the present disclosure may be understood as ability of transmitting data, such as transmission rate, transmission real-time capability, stability, etc.

Operation S230 may include: transmitting the to-be-transmitted data via the target communication channel.

An inter-processor communication method is provided in the present disclosure, in case that the electronic device at least includes the first core and the second core, the plurality of communication channels are defined between the first core and the second core, and each of the plurality of communication channels may have a communication performance different from each other. After acquiring the to-be-transmitted data which transmitted between the first core and the second core, the corresponding communication channel corresponding to the to-be-transmitted data may be selected from the plurality of communication channels as the target communication channel, and then the to-be-transmitted data may be transmitted via the target communication channel. Thus, when data is needed to be transmitted between the first core and the second core, the to-be-transmitted data may be transmitted via the corresponding communication channel corresponding to the to-be-transmitted data, thereby improving flexibility of the communication method between dual cores.

Figure 6:
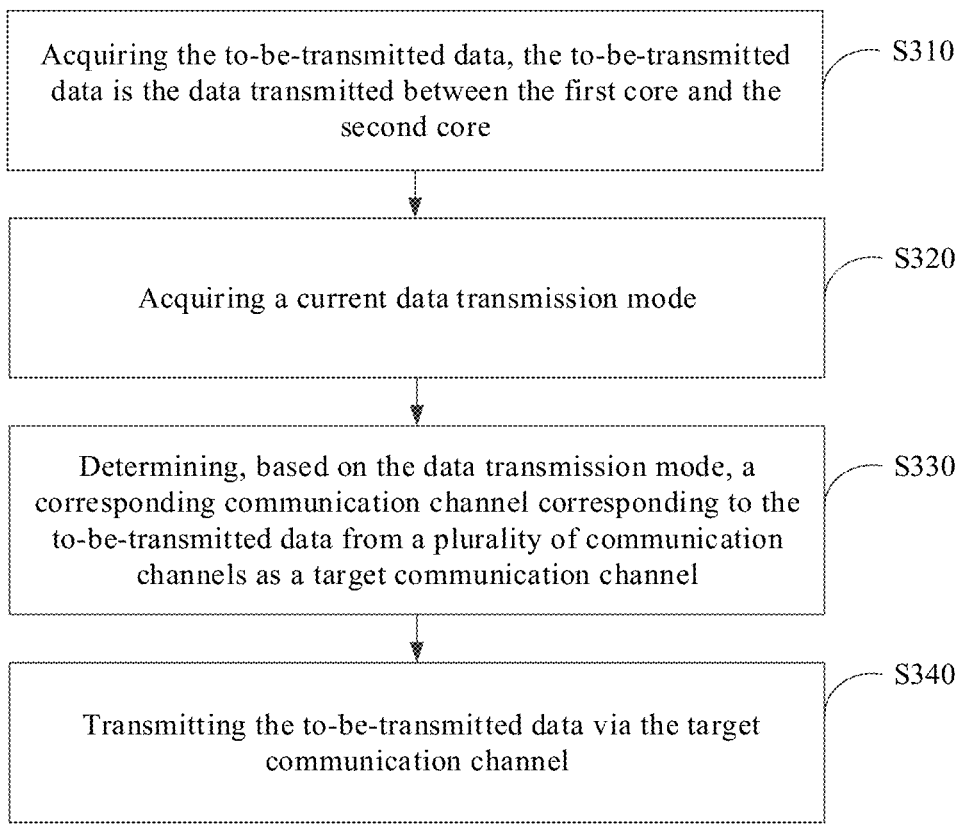
FIG. 6 is second flowchart of an inter-processor communication method according to an embodiment of the present disclosure.

As shown in FIG. 6, an inter-processor communication method provided in the embodiment of the present disclosure may be applied to the electronic device. The electronic device may at least include a first core and a second core. A plurality of communication channels may be defined between the first core and the second core, and and each of the plurality of communication channels may have a communication performance different from each other. The method may include following operations.

Operation S310 may include: acquiring the to-be-transmitted data, the to-be-transmitted data is the data transmitted between the first core and the second core.

Operation S320 may include: acquiring a current data transmission mode.

It should be noted that in this embodiment, a target communication channel of the to-be-transmitted data may be determined according to the current data transmission mode.

In this embodiment, many ways may be used to determine the current data transmission mode.

As one way, the current data transmission mode may be determined according to a throughput between the first core and the second core. It should be noted that the throughput between the first core and the second core may change in real time according to actual situation. For example, in a process of electronic device running lots of programs, there may be lots of data to interact between the first core and the second core, such that the throughput between the first core and the second core is relatively more. For another example, in response to the electronic device being in a dormant state, the electronic device does not need to process more data, such that to-be-transmitted data between the first core and the second core is relatively less. In this way, in response to detecting that the throughput between the first core and the second core is not larger than a specified transmission threshold, it may be determined that the current data transmission mode is a first data transmission mode with relatively less to-be-transmitted data. In response to detecting that the throughput between the first core and the second core is larger than the specified transmission threshold, it may be determined that the current data transmission mode is a second data transmission mode with relatively more to-be-transmitted data.

Figure 7:
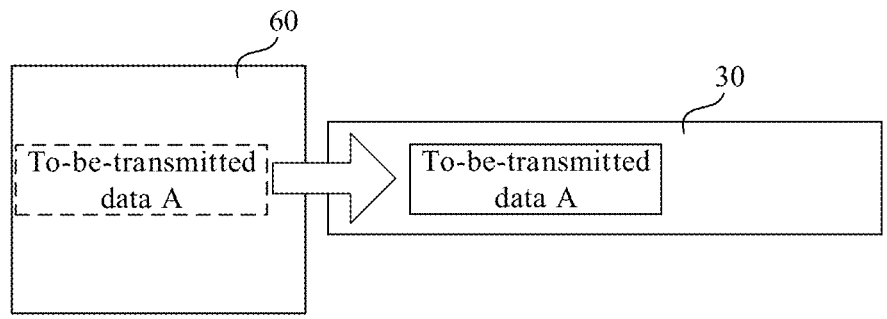
FIG. 7 is a schematic diagram of a sending buffer according to an embodiment of the present disclosure.

Optionally, the throughput may be characterized by acquiring a utilization rate of a specified sending buffer. It should be noted that in this embodiment, the to-be-transmitted data that has determined the target communication channel may be stored in the sending buffer, and then the to-be-transmitted data may be taken out from the sending buffer and send via the corresponding target communication channel. For example, as shown in FIG. 7, FIG. 7 includes a sending buffer 60 and a communication channel 30. After determining that a target communication channel corresponding to to-be-transmitted data A is the communication channel 30, the to-be-transmitted data A may be stored in the sending buffer 60, and then the communication channel 30 may directly read data from the sending buffer 60 and send data. Since the data in the sending buffer also needs to be sent in turn, the more the data needed to be sent in the sending buffer is, the larger the utilization rate of the sending buffer is. For example, in response to the utilization rate of the sending buffer being 50%, it means that half of area of the sending buffer is occupied by the to-be-transmitted data.

In case that the utilization rate of the specified sending buffer is used as the throughput, the specified transmission threshold may be a utilization threshold. Optionally, the utilization rate threshold may be 50%, so that in response to the utilization rate of the specified sending buffer being lower than 50%, it may be determined that the current data transmission mode is the first data transmission mode. In response to the utilization rate of the specified sending buffer being not lower than 50%, it may be determined that the current data transmission mode is the second data transmission mode.

It should be noted that the throughput between the first core and the second core may fluctuate. In order to recognize the current data transmission mode more accurately, it may be further determined that the current data transmission mode is the first data transmission mode in response to detecting that the throughput between the first core and the second core is not larger than the specified transmission threshold within a specified duration. Correspondingly, it may be determined that the current data transmission mode is the second data transmission mode in response to detecting that the throughput between the first core and the second core is larger than the specified transmission threshold within the specified duration. For example, the utilization rate of the specified sending buffer is taken as an example, the specified duration may be 1000 ms. Correspondingly, in response to detecting that the utilization rate of the specified sending buffer is less than 50% within 1000 ms, it is determined that the current data transmission mode is the first data transmission mode mentioned above. In response to detecting that the utilization rate of the specified sending buffer is not less than 50% within 1000 ms, it is determined that the current data transmission mode is the second data transmission mode mentioned above.

Optionally, the specified sending buffer may be a sending buffer corresponding to a communication channel. For example, the specified sending buffer may be a sending buffer corresponding to the first communication channel. It should be noted that the sending buffer corresponding to the communication channel may be understood as a sending buffer that data buffered in the sending buffer are transmitted via the corresponding communication channel.

Furthermore, as another way, the data transmission mode may also be determined by a current operation scene. It should be noted that the electronic device may need to collect lots of data in a process of running some programs, thereby leading frequent data transmission between different cores.

For example, the electronic device being a wearable device is taken as an example, in response to the wearable device being in a scene of monitoring motion data of a user, the wearable device needs to acquire collected data of a sensor for motion monitoring at a higher frequency to perform some state recognition. Optionally, data collection of the sensor may be controlled by the second core, and the state recognition may be performed by the first core. In this way, the second core may transmit the collected data of the sensor to the first core at a higher frequency so that the first core may perform fast state recognition. Correspondingly, after the first core completes the state recognition, the first core may continue to send some control instructions to the second core, such that the first core may have lots of data to transmit to the second core. Therefore, the electronic device may recognize current scene in which the wearable device is located and take, according to a corresponding relationship between a pre-established scene and a data transmission mode, a data transmission mode corresponding to the current scene as a current data transmission mode. Optionally, the scene in which the electronic device is located may include a motion detection scene and a sleep scene, the motion detection scene may correspond to the aforementioned second data transmission mode, and the sleep scene may correspond to the aforementioned first data transmission mode.

Operation S330 may include: determining, based on the data transmission mode, a corresponding communication channel corresponding to the to-be-transmitted data from a plurality of communication channels as a target communication channel.

As one way, the plurality of communication channels may include a first communication channel and a second communication channel. A data transmission rate of the first communication channel is faster than a data transmission rate of the second communication channel, transmission real-time capability of the second communication channel is better than transmission real-time capability of the first communication channel, and power consumption of the first communication channel is lower than power consumption of the second communication channel.

In this way, the operation of determining, based on the data transmission mode, a corresponding communication channel corresponding to the to-be-transmitted data from a plurality of communication channels as a target communication channel may include: in response to the current data transmission mode being the first data transmission mode, taking the first communication channel of the communication channels as the target communication channel; in response to the current data transmission mode being the second data transmission mode, acquiring a data type of the to-be-transmitted data; determining, based on the data type, a corresponding communication channel corresponding to the to-be-transmitted data from the plurality of communication channels as the target communication channel.

It should be noted that, as described above, the throughput in the first data transmission mode is less than the throughput in the second data transmission mode. Further, in response to the data transmission mode being the first data transmission mode, the first communication channel may be used for data transmission between the first core and the second core, so as to reduce power consumption due to the low power consumption characteristics of the first communication channel and ensure normal data transmission. In the second data transmission mode, relatively more data needs to be transmitted, and then both the first communication channel and the second communication channel may be used as the target communication channels. In order to further improve transmission flexibility, different types of data may be transmitted from the first communication channel or the second communication channel respectively.

Optionally, the operation of determining, based on the data transmission mode, a corresponding communication channel corresponding to the to-be-transmitted data from a plurality of communication channels as a target communication channel may include: in response to the to-be-transmitted data being real-time data, the second communication channel being used as the target communication channel; in response to the to-be-transmitted data is non-real-time data, at least the first communication channel being used as the target communication channel.

It should be understood that the second communication channel has better real-time capability than the first communication channel, thereby enabling to-be-transmitted data to a destination in a more timely manner. In a case that both the first communication channel and the second communication channel may be used as the target communication channel, in response to the to-be-transmitted data being real-time data, the second communication channel may be used as the target communication channel to enable the to-be-transmitted data to transmit to the destination in a timely manner. In response to the to-be-transmitted data being non-real-time data, the to-be-transmitted data is not necessary to be transmitted to the destination in time, and then the to-be-transmitted data may be transmitted via the first communication channel, or the to-be-transmitted data may be transmitted via the first communication channel and the second communication channel.

As a common transmission mode, the operation of in response to the to-be-transmitted data being non-real-time data, at least the first communication channel being used as the target communication channel may include: in response to the to-be-transmitted data being non-real-time data, acquiring occupation degree of the second communication channel; in response to the occupation degree being larger than a occupation threshold, taking the first communication channel as the target communication channel; in response to the occupation degree being not larger than the occupation threshold, dividing the to-be-transmitted data into a first part and a second part, and the first part and the second part are respectively have corresponding serial numbers for reorganizing in sequence; taking the first communication channel as a target communication channel for the first part, and taking the second communication channel as a target communication channel for the second part.

Figure 8:
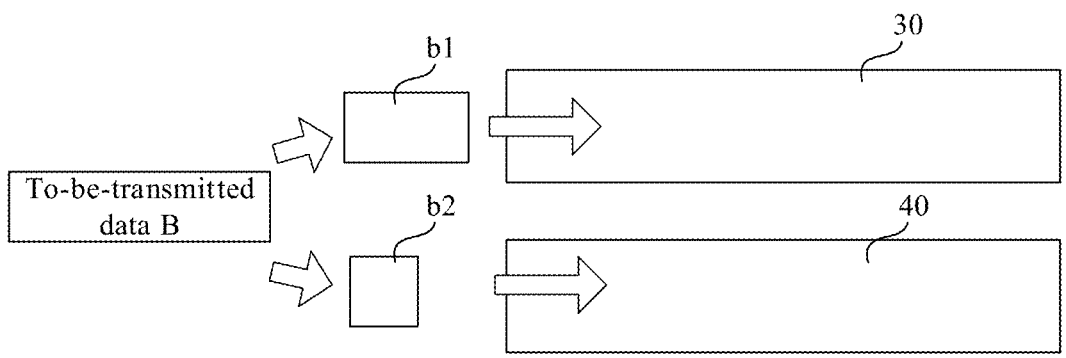
FIG. 8 is a schematic diagram of dividing to-be-transmitted data according to an embodiment of the present disclosure.

It should be understood that the second communication channel has good real-time communication capability, but the electronic device may not always transmit the real-time data. In this case, in response to the second communication channel being idle (for example, the occupation degree of the second communication channel is not larger than the occupation threshold), The second communication channel may also be used to transmit the non-real-time data, thereby further improving data transmission efficiency. For example, as shown in FIG. 8, both the communication channel 30 and the communication channel 40 may be used as the target communication channels, and then data B to be transmitted may be divided into a first part b1 and a second part b2, and the target channel for the first part b1 is used as the communication channel 30, the target communication channel for the second part b2 is used as the communication channel 40. The communication channel 30 may be the first communication channel, and the communication channel 40 may be the second communication channel.

It should be noted that different parts of the divided to-be-transmitted data are transmitted via different communication channels, such that the different parts are transmitted to the destination at different time, the different parts may be reorganized according to established corresponding serial numbers of each of the different parts mentioned above, so as to ensure completion and order of the to-be-transmitted data. For example, when the serial number of the first part b1 is n1, and the serial number of the second part b1 is n2, then in case of recognizing that n1 being ranked before n2, the second part b2 may be spliced at tail of the first part b1 in response to the first part b1 and the second part b2 being reorganized.

As one way, the occupation degree of the second communication channel in this embodiment may be determined in a plurality of ways. Optionally, the occupation degree of the second communication channel may be characterized by the amount of data transmitted via the second communication channel during a specified duration. Furthermore, a sending buffer corresponding to each communication channel may be defined in the electronic device. Correspondingly, the occupation degree of the second communication channel may be determined by acquiring utilization rate of a sending buffer corresponding to the second communication channel. For example, in response to the utilization rate of the sending buffer corresponding to the second communication channel being larger than 50%, it is determined that the occupation degree is larger than the occupation threshold; otherwise, in response to the utilization rate of the sending buffer corresponding to the second communication channel being not larger than 50%, it is determined that the occupation degree is not larger than the occupation threshold.

Besides the first communication channel and the second communication channel mentioned above, the communication channels defined between the first core and the second core may optionally include a third communication channel, and the operation of acquiring a corresponding communication channel corresponding to the to-be-transmitted data from a plurality of communication channels as a target communication channel may also include: in response to the to-be-transmitted data being state-type data, acquiring the third communication channel from the plurality of communication channels as the target communication channel.

Operation S340 may include: transmitting the to-be-transmitted data via the target communication channel.

Figure 9:
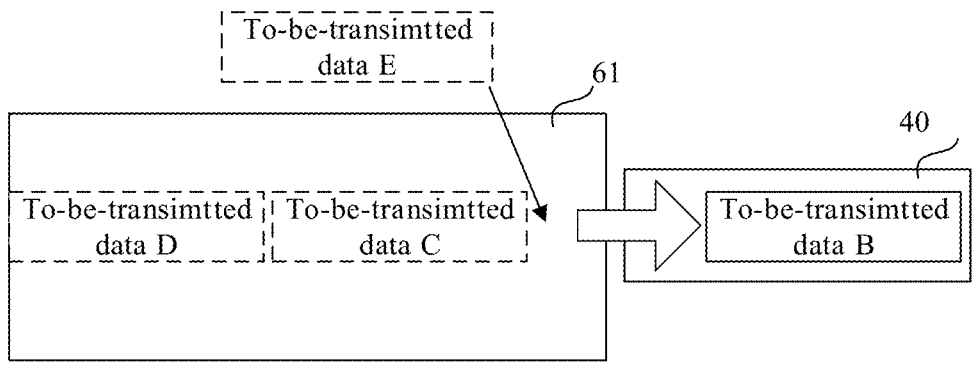
FIG. 9 is a schematic diagram of most-forward transmission position according to an embodiment of the present disclosure.

After determining the target communication channel of the to-be-transmitted data in the above manner, the to-be-transmitted data may be transmitted via the corresponding target communication channel. It should be noted that the real-time data may need to be transmitted to the destination in a timely manner. However, in some cases, the second communication channel may have lots of data waiting to be transmitted. In order to facilitate transmission of real-time data, it is optional that in response to the current data transmission mode being second data transmission mode and the to-be-transmitted data is real-time data, the to-be-transmitted data is transmitted via the second communication channel may include: in response to the current data transmission mode being the second data transmission mode and the to-be-transmitted data being real-time data, configuring the to-be-transmitted data in most-forward position of the sending buffer of the second communication channel for transmission. Optionally, as shown in FIG. 9, the second communication channel 40 corresponds to a sending buffer 61. A data needed to be transmitted via the second communication channel 40 may be firstly buffered into the sending buffer 61, and then the data may be read into the second communication channel 40 for transmission. The sending buffer 61 may include a plurality of transmission positions for storing buffered data, and each of the transmission positions may correspond to a different transmission order. The more forward the transmission position is, the higher the priority of the corresponding transmission order is.

It should be noted that the forward position may be understood as a position close to an exit of the sending buffer. It may be understood that the data in the sending buffer 61 is moved out of the sending buffer 61 and written to the second communication channel 40 via the exit of the sending buffer. The closer the transmission position is to the exit of the sending buffer 61, the more forward the transmission position is, such that the data stored in the most-forward position of the sending buffer 61 is transmitted with a highest priority. In order to enable the to-be-transmitted data to transmit to the second core as soon as possible, the to-be-transmitted data may be configured in the most-forward position of the sending buffer for transmission in case that it is determined that the to-be-transmitted data is the real-time data. For example, as shown in FIG. 9, to-be-transmitted data B is currently transmitted in the second communication channel 40, and to-be-transmitted data C and to-be-transmitted data D are subsequently transmitted in turn. Then, in a case that to-be-transmitted data E is currently determined, and then in a case that it is determined that the data E to be transmitted is real-time data, the to-be-transmitted data E may be configured in the most-forward position of the sending buffer for transmission.

It should be noted that in this embodiment, the first communication channel may be the communication channel 30 in FIG. 1, the second communication channel may be the communication channel 40 in FIG. 1, and the third communication channel may be the communication channel 50 in FIG. 1. Furthermore, the first communication channel may include data route for transmitting data between the first core and the second core, first timing-sequence route for controlling the first core to actively send data to the second core, and second timing-sequence route for controlling the second core to actively send data to the first core. The state type-data may include data about the work state, data about the register state and log data, such that the third communication channel may include third route, and fourth route, the third route may be configured to request the work state of the second core and the register state of the second core by the first core, and the fourth route may be configured to output the log data to the first core by the second core.

The inter-processor communication method is provided in the present disclosure. In this way mentioned above, when data is needed to be transmitted between the first core and the second core, the to-be-transmitted data may be transmitted via the corresponding communication channel corresponding to the to-be-transmitted data, thereby improving flexibility of communication method between dual cores. In addition, the first communication channel of the communication channels in this embodiment has characteristics of fast data transmission rate, and the second communication channel of the communication channels in this embodiment has characteristics of good transmission real-time capability. Therefore, it possible to choose whether to transmit data via the first communication channel or the second communication channel according to current data transmission mode, so as to improve flexibility of data transmission and have a good transmission real-time capability and a fast transmission rate.

Figure 10:
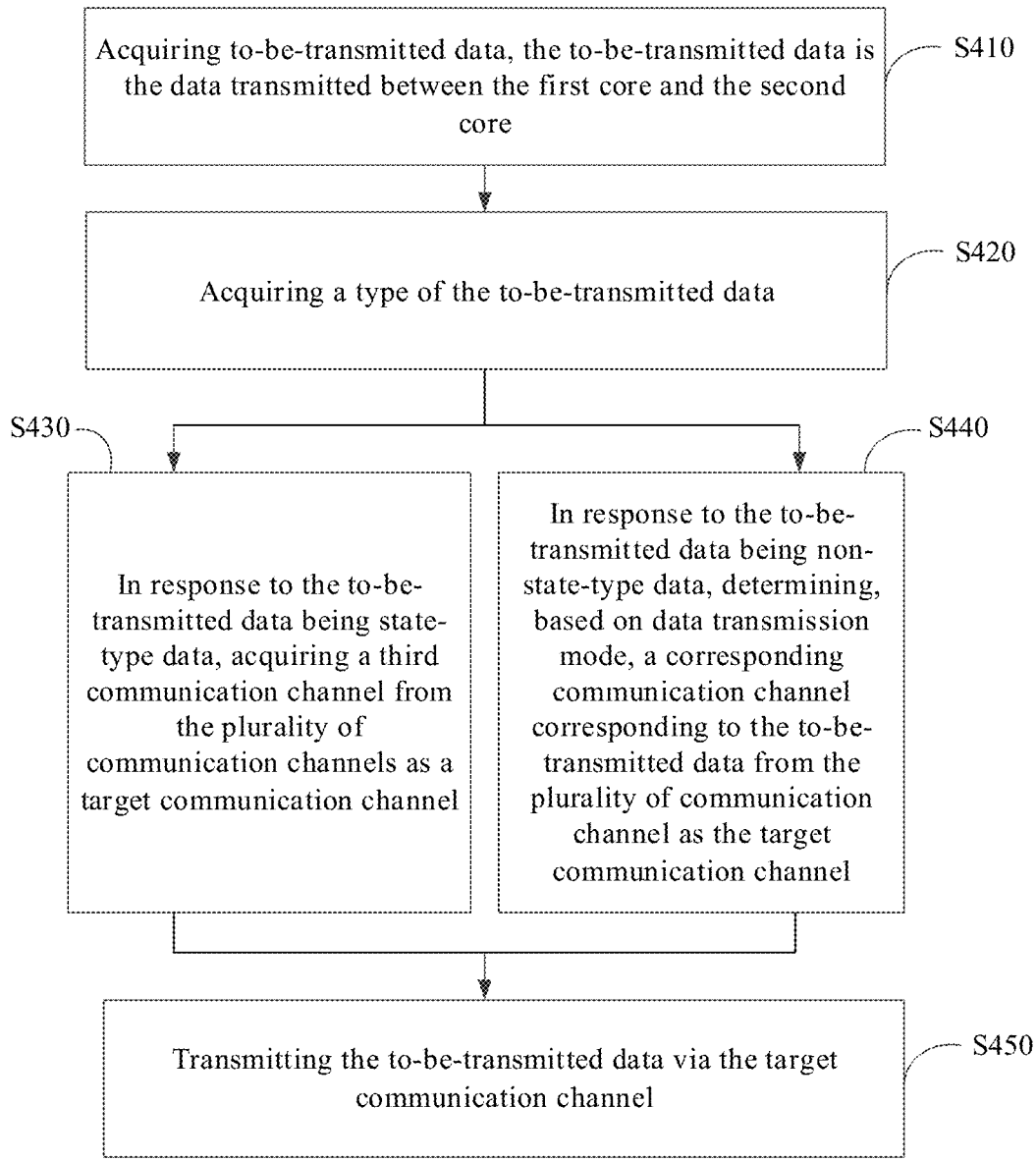
FIG. 10 is third flowchart of an inter-processor communication method according to an embodiment of the present disclosure.

As shown in FIG. 10. An inter-processor communication method is provided by the embodiments of the present disclosure, and the method is performed by the electronic device. The electronic device may at least include a first core and a second core. A plurality of communication channels may be defined between the first core and the second core, and each of the plurality of communication channels may have a communication performance different from each other. The method may include follow operations.

Operation S410 may include: acquiring to-be-transmitted data, the to-be-transmitted data is data transmitted between the first core and the second core.

Operation S420 may include: acquiring a type of the to-be-transmitted data.

Operation S430 may include: in response to the to-be-transmitted data being state-type data, acquiring a third communication channel from the plurality of communication channels as a target communication channel.

Operation S440 may include: in response to the to-be-transmitted data being non-state-type data, determining, based on data transmission mode, a corresponding communication channel corresponding to the to-be-transmitted data from the plurality of communication channels as the target communication channel.

Operation S450 may include: transmitting the to-be-transmitted data via the target communication channel.

Figure 11:
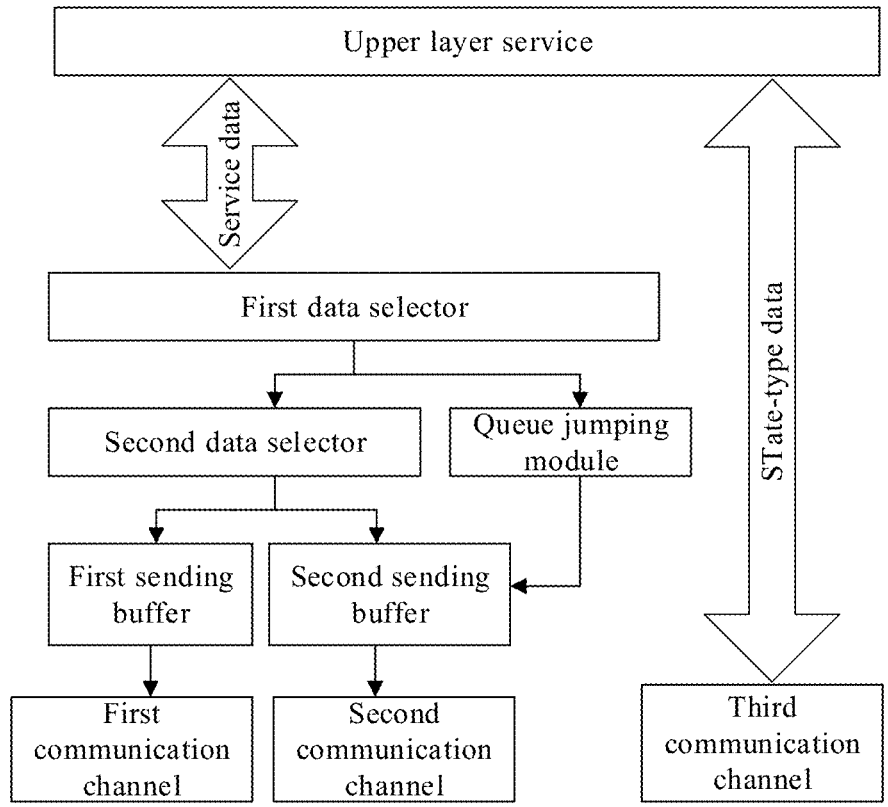
FIG. 11 is a schematic diagram of a data transmission path according to an embodiment of the present disclosure.

It should be noted that the method of determining, based on data transmission mode in this embodiment, a corresponding communication channel corresponding to the to-be-transmitted data from the plurality of communication channels is the same as the method in above embodiment. The overall flow of this embodiment is described again by the schematic diagram shown in FIG. 11. An upper layer service may be an application layer service, for example, the upper layer service may be a service monitoring operation data of users, or other debugging services. In response to the upper layer service generating data that needs to be transmitted to another core, then the data is used as the to-be-transmitted data. After acquiring the to-be-transmitted data, the type of the to-be-transmitted data is firstly recognized. In response to the recognized data being the state-type data, the third communication channel is used as the target communication channel to transmit the to-be-transmitted data via the third communication channel. In response to the recognized data being non-state-type data (the non-state-type data may be understood as service data), the current data transmission mode is recognized. In response to the current data transmission mode being the first data transmission mode mentioned above, the first communication channel is directly determined as the target communication channel, and then the to-be-transmitted data is stored in a first sending buffer corresponding to the first communication channel. In response to the current data transmission mode being the second data transmission mode mentioned above, a first data selector determines whether the to-be-transmitted data is the real-time data. In response to the to-be-transmitted data being the real-time data, the first data selector transmits the to-be-transmitted data to a queue jumping module so that the queue jumping module may be stored in the second sending buffer corresponding to the second communication channel.

In response to the to-be-transmitted data being the non-real-time-type data, the to-be-transmitted data is transmitted to a second data selector, and then the second data selector may determine, according to the above method, whether to store the to-be-transmitted data in the first sending buffer, or divide the to-be-transmitted data into a first part stored in the first sending buffer and a second part stored in the second sending buffer.

It should be noted that in this embodiment, an identification table of real-time data and the sequence-dependent-identification table of real-time data may be set in advance. Optionally, after acquiring the to-be-transmitted data, the first data selector may query whether the identification table of real-time-type data include an identifier of the to-be-transmitted data. In response to the identification table of real-time-type data including the identifier of the to-be-transmitted data, the first data selector determines that the to-be-transmitted data is the real-time-type data. Furthermore, when it is determined that the to-be-transmitted data is the real-time data, it is possible to further query, through the sequence-dependent-identification table, whether the to-be-transmitted data can be queued to most-forward position of the second communication channel for transmission. Optionally, when the to-be-transmitted data is detected that the to-be-transmitted data still needs to rely on data that has not been sent in first buffer or a second buffer, even if the to-be-transmitted data is recognized as the real-time-type data, the to-be-transmitted data is not queued to the most-forward position of the second communication channel for transmission, but is configured behind the relied data that has not been sent to transmitted.

The inter-processor communication method is provided in the present disclosure, and the method may include: acquiring the type of to-be-transmitted data. The state-type data may be directly transmitted via the third communication channel, and the non-state-type data may be determined, further based on the current data transmission mode, the corresponding target communication channel. In this way, when data is needed to be transmitted between the first core and the second core, the to-be-transmitted data may be transmitted via the corresponding communication channel corresponding to the to-be-transmitted data, thereby improving flexibility of communication method between dual cores. Data of different types may be transmitted via different communication channels, which is conducive to isolate transmission of data of different types and avoid interference, thereby improving data transmission rate and stability of data transmission.

Figure 12:
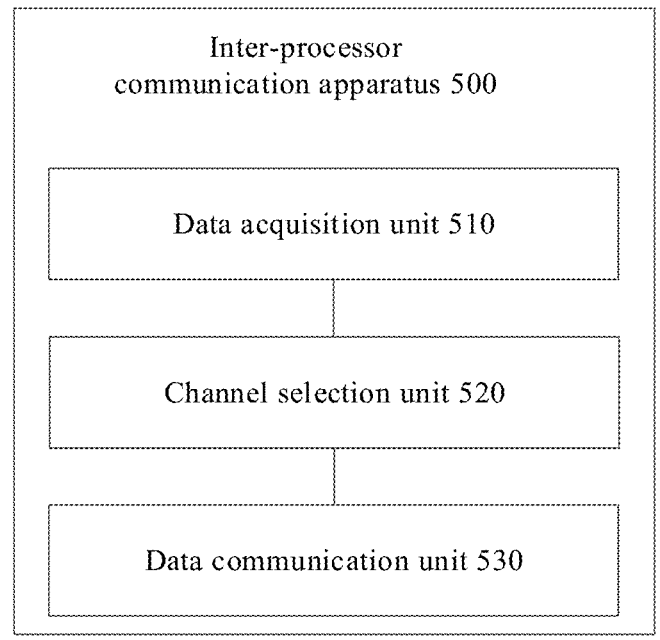
FIG. 12 is a structural block diagram of an inter-processor communication apparatus according to an embodiment of the present disclosure.

As shown in FIG. 12. An inter-processor communication apparatus 500 provided in the embodiments of the present disclosure, and runs on the electronic device. The electronic device may at least include a first core and a second core. A plurality of communication channels may be defined between the first core and the second core, and each of the plurality of communication channels may have a communication performance different from each other. The device 500 may include following units.

The device 500 may include a data acquisition unit 510 used to acquire to-be-transmitted data, the to-be-transmitted data is data transmitted between the first core and the second core.

The device 500 may include a channel selection unit 520 used to acquire a corresponding communication channel corresponding to the to-be-transmitted data from the plurality of communication channels as a target communication channel.

The device 500 may include a data communication unit 530 used to transmit the to-be-transmitted data via the target communication channel.

As one way, the channel selection unit 520 may be specifically used to acquire a current data transmission mode. The corresponding communication channel corresponding to the to-be-transmitted data is determined from the plurality of communication channels based on the data transmission mode as the target communication channel.

Optionally, the communication performance includes data transmission rate and transmission real-time capability. Correspondingly, the channel selection unit 520 is specifically used to: take the first communication channel of the communication channels as the target communication channel in response to the current data transmission mode being the first data transmission mode; acquire the data type of the to-be-transmitted data in response to the current data transmission mode being the second data transmission mode; determine, based on the data type, the corresponding communication channel corresponding to the to-be-transmitted data from the plurality of communication channels as the target communication channel. Data transmission rate of the first communication channel is faster than that of the second communication channel, and transmission real-time capability of the second communication channel is better than that of the first communication channel.

Optionally, the channel selection unit 520 is specifically used to: take the second communication channel as the target communication channel in response to the to-be-transmitted data being real-time data; at least take the first communication channel as the target communication channel in response to the to-be-transmitted data being non-real-time data.

The channel selection unit 520 is specifically used to: in response to the to-be-transmitted data being non-real-time data, acquire occupation degree of the second communication channel; in response to the occupation degree being larger than an occupation threshold, take the first communication channel as the target communication channel; in response to the occupation degree being not larger than the occupation threshold, divide the to-be-transmitted data into a first part and a second part, and the first part and the second part are respectively have corresponding serial numbers for reorganizing in sequence; take the first communication channel as a target communication channel for the first part, and taking the second communication channel as a target communication channel for the second part.

Furthermore, the channel selection unit 520 is specifically used to: in response to the current data transmission mode being the second data transmission mode and the to-be-transmitted data is real-time data, configure the to-be-transmitted data in most-forward position of the sending buffer of the second communication channel for transmission.

In one way, the channel selection unit 520 is specifically used to: acquire utilization rate of the sending buffer; determine current data transmission mode based on the utilization rate. Optionally, the channel selection unit 520 is specifically used to: determine current data transmission mode as the first data transmission mode in response to the utilization rate being larger than a utilization rate threshold; determine the current data transmission mode as the second data transmission mode in response to the utilization rate being not larger than a utilization rate threshold.

Also, as a way, the channel selection unit 520 is specifically used to: acquire a third communication channel from the plurality of communication channels as the target communication channel in response to the to-be-transmitted data being state-type data.

In the way mentioned above, the inter-processor communication apparatus provided in the present disclosure may make may be used to: transmit the to-be-transmitted data via the corresponding communication channel corresponding to the to-be-transmitted data when data needs to be transmitted between the first core and the second core, thereby improving flexibility of communication method between dual cores. In addition, the first communication channel of the communication channels in this embodiment has characteristics of fast data transmission rate, and the second communication channel of the communication channels in this embodiment has characteristics of good transmission real-time capability. Therefore, it possible to choose, according to current data transmission mode, whether to transmit data via the first communication channel or the second communication channel, so as to improve flexibility of data transmission and have good transmission real-time capability and fast transmission rate.

An electronic assembly provided in the embodiments of the present disclosure, and includes a first core and a second core. A plurality of communication channels may be defined between the first core and the second core, and each of the plurality of communication channels may have a communication performance different from each other.

The first core may be configured to: acquire to-be-transmitted data; acquire a corresponding communication channel corresponding to the to-be-transmitted data from the plurality of communication channels as a target communication channel; transmit, the to-be-transmitted data to the second core via the target communication channel.

In the way mentioned above, the electronic assembly provided in the present disclosure may be used to: transmit the to-be-transmitted data via the corresponding communication channel corresponding to the to-be-transmitted data when data needs to be transmitted between the first core and the second core, thereby improving flexibility of communication method between dual cores.

It should be noted that the device embodiments and the electronic assembly embodiments in the present disclosure correspond to the aforementioned method embodiments. Specific principles in the device embodiments and the electronic assembly embodiments may be referred to the aforementioned method embodiments, which is not repeated here.

An electronic device provided in the present disclosure is described below in combination with FIG. 13.

Figure 13:
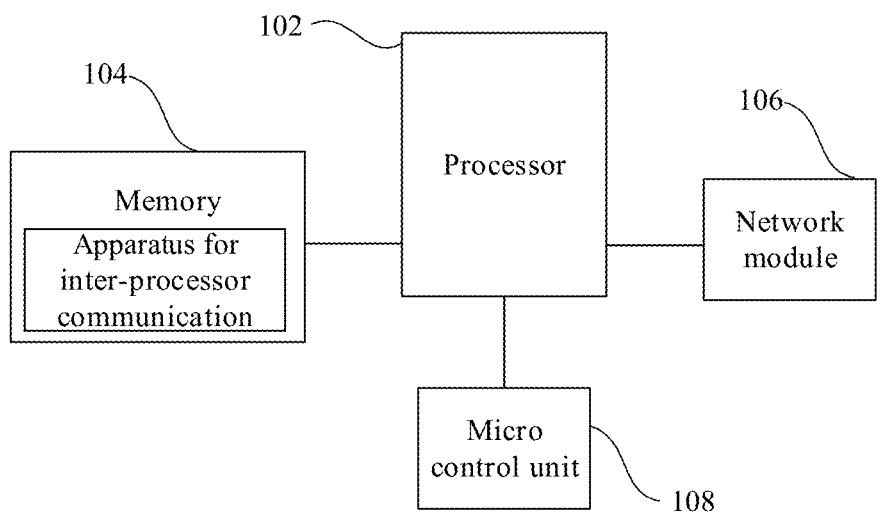
FIG. 13 is a structural block diagram of an electronic device used to perform an inter-processor communication method according to an embodiment of the present disclosure.

As shown in FIG. 13, based on above inter-processor communication method, another electronic device 200 is provided in the embodiments of the present disclosure, and the electronic device 200 may perform the above inter-processor communication method. The electronic device 200 may be a wearable device such as a smart bracelet, a smart watch, the electronic device 200 may also be a smart phone, a tablet computer, etc.

The electronic device 200 may include a processor 102, a memory 104, a network module 106, and a micro control unit (MCU) 108. The memory 104 may store a program that may execute contents of the above embodiments, and the processor 102 may execute the program stored in the memory 104. An internal structure of the processor 102 may be as shown in FIG. 1.

The processor 102 may include one or more cores configured to process data and a message matrix unit. The processor 102 may connect various parts of the electronic device 200 through various interfaces and lines, and executes various functions and processes data of the electronic device 200 by running or executing instructions, programs, code sets or instruction sets stored in the memory 104, and calling data stored in the memory 104. Optionally, the processor 102 may be implemented in at least one hardware form of a digital signal processing (DSP), a field programmable gate array (FPGA), and a programmable logic array (PLA). The processor 102 may integrate one or more combinations of a central processing unit (CPU), a graphics processing unit (GPU), and a modem. The CPU may be configured to mainly deal with an operating system, a user interface and application program, etc. The GPU may be configured to render and draw displayed content. The Modem may be configured to handle wireless communication. It may be understood that the above modem may also be implemented independently through a communication chip without being integrated into the processor 102.

The memory 104 may include a random-access memory (RAM) or a read-only memory (ROM). The memory 104 may be configured to store instructions, programs, codes, code sets, or instruction sets. The memory 104 may include a storage program area and a storage data area, the storage program area may store instructions for implementing an operating system, instructions for implementing at least one function (such as touch function, sound playing function, image playing function, etc.), instructions for implementing each of following method embodiments, and the like. For example, the memory 104 may store an apparatus for inter-processor communication. The apparatus for inter-processor communication may be the inter-processor communication apparatus 400. The storage data area may also store data (such as phonebook, audio and video data, chat record data) created by the terminal 100 in use.

The network module 106 is used to receive and send electromagnetic waves, realize mutual conversion between electromagnetic waves and electrical signals, so as to communicate with communication networks or other devices, such as an audio playback device. The network module 106 may include various existing circuit elements for performing these functions, such as an antenna, a radio frequency transceiver, a digital signal processor, an encryption/decryption chip, a subscriber identity module (SIM) card, a memory, and the like. The network module 106 may communicate with various networks, such as the Internet, the enterprise intranet, and the wireless network, or communicate with other apparatuses through the wireless network. The wireless network may include a cellular telephone network, a wireless local area network or a metropolitan area network. For example, the network module 106 may exchange information with a base station.

Figure 14:
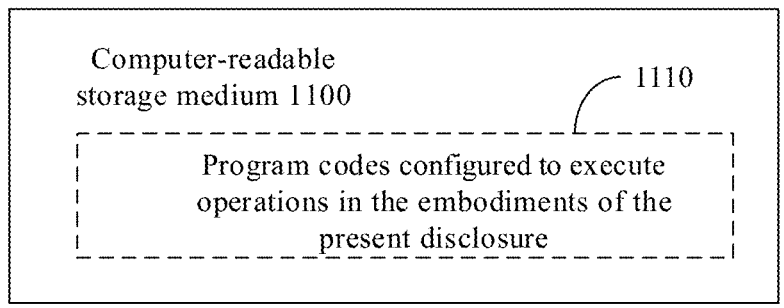
FIG. 14 is a structural block diagram of a storage unit used to store or carry program codes for implementing an inter-processor communication method according to an embodiment of the present disclosure.

As shown in FIG. 14, FIG. 14 is a structure block diagram of a computer-readable storage medium provided in the embodiment of the present disclosure. The computer-readable storage medium 1100 may store program codes, and the program codes may be called by a processor to execute the methods described in the above method embodiments.

The computer-readable storage medium 1100 may be an electronic memory such as a flash memory, an electrically erasable programmable read only memory (EEPROM), an erasable programmable read only memory (EPROM), a hard disk, or the ROM. Optionally, the computer-readable storage medium 1100 may include a non-transitory computer-readable storage medium. The computer-readable storage medium 1100 may have a storage space of program codes 1110 that executes any of operations in above methods. The program codes 1110 may be read from or written into one or more computer program products. The program codes 1110 may be compressed in an appropriate form.

An inter-processor communication method performed by an electronic device is provided in the present disclosure, and at least includes a first core and a second core, a plurality of communication channels are defined between the first core and the second core, each of the plurality of communication channels has a communication performance different from each other. The method includes: acquiring to-be-transmitted data, the to-be-transmitted data is data transmitted between the first core and the second core; acquiring a corresponding communication channel corresponding to the to-be-transmitted data from the plurality of communication channels as a target communication channel; transmitting the to-be-transmitted data via the target communication channel.

In some embodiments, the acquiring a corresponding communication channel corresponding to the to-be-transmitted data from the plurality of communication channels as a target communication channel, includes: acquiring a current data transmission mode; determining, based on the data transmission mode, the corresponding communication channel corresponding to the to-be-transmitted data from the communication channels as a target communication channel.

In some embodiments, the communication channels include a first communication channel and a second communication channel; the determining, based on the data transmission mode, the corresponding communication channel corresponding to the to-be-transmitted data from the communication channels as the target communication channel, includes: taking the first communication channel of the communication channels as the target communication channel in response to the current data transmission mode being a first data transmission mode; acquiring a data type of the to-be-transmitted data in response to the current data transmission mode being a second data transmission mode; determining, based on the data type, the corresponding communication channel corresponding to the to-be-transmitted data from the communication channels as the target communication channel; a data transmission rate of the first communication channel is faster than that of the second communication channel, and a transmission real-time capability of the second communication channel is better than that of the first communication channel.

In some embodiments, the determining, based on the data type, the corresponding communication channel corresponding to the to-be-transmitted data from the plurality of communication channels as a target communication channel, includes: taking the second communication channel as the target communication channel in response to the to-be-transmitted data being real-time data; at least taking the first communication channel as the target communication channel in response to the to-be-transmitted data being non-real-time data.

In some embodiments, the at least taking the first communication channel as the target communication channel in response to the to-be-transmitted data being non-real-time data, includes: acquiring an occupation degree of the second communication channel in response to the to-be-transmitted data being the non-real-time data; taking the first communication channel as the target communication channel in response to the occupation degree being larger than an occupation threshold; dividing the to-be-transmitted data into a first part and a second part in response to the occupation degree being not larger than the occupation threshold, the first part and the second part respectively have corresponding serial numbers for reorganizing in sequence; aking the first communication channel as the target communication channel for the first part, and taking the second communication channel as the target communication channel for the second part.

In some embodiments, the transmitting the to-be-transmitted data via the target communication channel, includes: configuring the to-be-transmitted data in most-forward transmission position of a sending buffer of the second communication channel for transmission in response to the to-be-transmitted data being the real-time data.

In some embodiments, the first communication channel includes data route configured to transmit data between the first core and the second core, first timing-sequence route configured to control the first core to actively send data to the second core, and second timing-sequence route configured to control the second core to actively send data to the first core.

In some embodiments, the acquiring a current data transmission mode, includes: acquiring a utilization rate of a sending buffer; determining the current data transmission mode based on the utilization rate.

In some embodiments, the determining the current data transmission mode based on the utilization rate, includes: determining the current data transmission mode as a first data transmission mode in response to the utilization rate being larger than a utilization rate threshold; determining the current data transmission mode as a second data transmission mode in response to the utilization rate being not larger than the utilization rate threshold.

In some embodiments, the communication channels further include a third communication channel; before the acquiring a current data transmission mode, the method further includes: acquiring the third communication channel from the communication channels as the target communication channel in response to the to-be-transmitted data being state-type data; performing the acquiring a current data transmission mode in response to the to-be-transmitted data being non-state-type data.

In some embodiments, the third communication channel includes third route configured to request work state of the second core and register state of the second core by the first core, fourth route configured to output log data to the first core by the second core.

An electronic assembly is provided in the present disclosure, and includes a first core and a second core, a plurality of communication channels are defined between the first core and the second core, each of the plurality of communication channels has a communication performance different from each other. The first core is configured to: acquire a current data transmission mode; acquire a corresponding communication channel corresponding to the to-be-transmitted data from the plurality of communication channels as a target communication channel; transmit the to-be-transmitted data to the second core via the target communication channel.

In some embodiments, the first core is configured to: acquire a current data transmission mode; determine, based on the data transmission mode, the corresponding communication channel corresponding to the to-be-transmitted data from the communication channels as a target communication channel.

In some embodiments, the communication channels include a first communication channel and a second communication channel, and the first core is configured to: take the first communication channel of the communication channels as the target communication channel in response to the current data transmission mode being a first data transmission mode; acquire a data type of the to-be-transmitted data in response to the current data transmission mode being a second data transmission mode; determine, based on the data type, the corresponding communication channel corresponding to the to-be-transmitted data from the communication channels as a target communication channel; a data transmission rate of the first communication channel is faster than that of the second communication channel, and a transmission real-time capability of the second communication channel is better than that of the first communication channel.

In some embodiments, the first core is configured to: take the second communication channel as the target communication channel in response to the to-be-transmitted data being real-time data; at least take the first communication channel as the target communication channel in response to the to-be-transmitted data being non-real-time data; acquire an occupation degree of the second communication channel in response to the to-be-transmitted data being the non-real-time data; take the first communication channel as the target communication channel in response to the occupation degree being larger than an occupation threshold; divide the to-be-transmitted data into a first part and a second part in response to the occupation degree being not larger than the occupation threshold, the first part and the second part respectively have corresponding serial numbers for reorganizing in sequence; take the first communication channel as the target communication channel for the first part, and taking the second communication channel as the target communication channel for the second part; configure the to-be-transmitted data in most-forward transmission position of a sending buffer of the second communication channel for transmission in response to the to-be-transmitted data being the real-time data.

In some embodiments, the first communication channel includes data route configured to transmit data between the first core and the second core, first timing-sequence route configured to control the first core to actively send data to the second core, and second timing-sequence route configured to control the second core to actively send data to the first core.

In some embodiments, the first core is configured to: acquire a utilization rate of a sending buffer; determine the current data transmission mode based on the utilization rate; determine the current data transmission mode as a first data transmission mode in response to the utilization rate being larger than a utilization rate threshold; determine the current data transmission mode as a second data transmission mode in response to the utilization rate being not larger than the utilization rate threshold.

In some embodiments, the communication channels further include a third communication channel, and the first core is configured to: acquire the third communication channel from the communication channels as the target communication channel in response to the to-be-transmitted data being state-type data; perform the acquiring a current data transmission mode in response to the to-be-transmitted data being non-state-type data.

In some embodiments, the third communication channel includes third route configured to request work state of the second core and register state of the second core by the first core, fourth route configured to output log data to the first core by the second core.

An electronic device is provided in the present disclosure, and include a processor and a memory. one or more programs are stored in the memory and used to be executed by the processor to implement any one of methods mentioned above.

To sum up, the inter-processor communication method, the apparatus, the electronic assembly, the electronic device, and the storage medium are provided in the present disclosure. The electronic device at least includes the first core and the second core, the plurality of communication channels are defined between the first core and the second core. In a case that each the plurality of communication channels respectively has a communication performance different from each other. After acquiring to-be-transmitted data which transmitted between the first core and the second core, in the plurality of communication channels, the corresponding communication channel corresponding to the to-be-transmitted data may be used as the target communication channel, thereby transmitting the to-be-transmitted data via the target communication channel. In this way, when data is needed to be transmitted between the first core and the second core, the to-be-transmitted data may be transmitted via the corresponding communication channel corresponding to the data, thereby improving flexibility of communication method between dual cores.

Finally, it should be noted that the above embodiments are only used to illustrate the technical solution of the present disclosure, but not to limit it. Although the present disclosure has been described in detail with reference to the above embodiments, those skilled in the art should understand that they may still modify the technical solution recorded in the above embodiments, or equivalent replace some of the technical features. These modifications or replacements do not drive the technical solutions away from the spirit and scope of the technical solution in the embodiments of the present disclosure.

What is claimed is:

1. An inter-processor communication method, performed by an electronic device, the electronic device at least comprising a first core and a second core, and a plurality of communication channels being defined between the first core and the second core, each of the plurality of communication channels having a communication performance different from each other, the plurality of communication channels being implemented based on different communication protocols, and the method comprising:
acquiring to-be-transmitted data, wherein the to-be-transmitted data is data transmitted between the first core and the second core;
acquiring a corresponding communication channel corresponding to the to-be-transmitted data from the plurality of communication channels as a target communication channel; and transmitting the to-be-transmitted data via the target communication channel.

2. The method as claimed in claim 1, wherein acquiring the corresponding communication channel corresponding to the to-be-transmitted data from the plurality of communication channels as the target communication channel, comprises:
  acquiring a current data transmission mode; and
  determining, based on the data transmission mode, the corresponding communication channel corresponding to the to-be-transmitted data from the communication channels as a target communication channel.

3. The method as claimed in claim 2, wherein the communication channels comprise a first communication channel and a second communication channel; and the determining, based on the data transmission mode, the corresponding communication channel corresponding to the to-be-transmitted data from the communication channels as the target communication channel, comprises:
  taking the first communication channel of the communication channels as the target communication channel in response to the current data transmission mode being a first data transmission mode;
  acquiring a data type of the to-be-transmitted data in response to the current data transmission mode being a second data transmission mode; and
  determining, based on the data type, the corresponding communication channel corresponding to the to-be-transmitted data from the communication channels as the target communication channel;
  wherein a data transmission rate of the first communication channel is faster than that of the second communication channel, and a transmission real-time capability of the second communication channel is better than that of the first communication channel.

4. The method as claimed in claim 1,
  wherein the communication channels comprise a first communication channel and a second communication channel; and acquiring the corresponding communication channel corresponding to the to-be-transmitted data from the plurality of communication channels as the target communication channel, comprises:
  acquiring a current data transmission mode; and
  taking the first communication channel of the communication channels as the target communication channel in response to the current data transmission mode being a first data transmission mode;
  acquiring a data type of the to-be-transmitted data in response to the current data transmission mode being a second data transmission mode; taking the second communication channel as the target communication channel in response to the to-be-transmitted data being real-time data; and at least taking the first communication channel as the target communication channel in response to the to-be-transmitted data being non-real-time data; wherein a data transmission rate of the first communication channel is faster than that of the second communication channel, and a transmission real-time capability of the second communication channel is better than that of the first communication channel.

5. The method as claimed in claim 4, wherein at least taking the first communication channel as the target communication channel in response to the to-be-transmitted data being non-real-time data, comprises:
  acquiring an occupation degree of the second communication channel in response to the to-be-transmitted data being the non-real-time data;
  taking the first communication channel as the target communication channel in response to the occupation degree being larger than an occupation threshold;
  dividing the to-be-transmitted data into a first part and a second part in response to the occupation degree being not larger than the occupation threshold, wherein the first part and the second part respectively have corresponding serial numbers for reorganizing in sequence; and
  taking the first communication channel as the target communication channel for the first part, and taking the second communication channel as the target communication channel for the second part.

6. The method as claimed in claim 3, wherein transmitting the to-be-transmitted data via the target communication channel, comprises:
  configuring the to-be-transmitted data in a most-forward transmission position of a sending buffer of the second communication channel for transmission in response to the to-be-transmitted data being the real-time data.

7. The method as claimed in claim 3, wherein the first communication channel comprises a data route configured to transmit data between the first core and the second core, a first timing-sequence route configured to control the first core to actively send data to the second core, and a second timing-sequence route configured to control the second core to actively send data to the first core.

8. The method as claimed in claim 2, wherein acquiring the current data transmission mode, comprises:
  acquiring a utilization rate of a sending buffer; and
  determining the current data transmission mode based on the utilization rate.

9. The method as claimed in claim 8, wherein determining the current data transmission mode based on the utilization rate, comprises:
  determining the current data transmission mode as a first data transmission mode in response to the utilization rate being larger than a utilization rate threshold; and
  determining the current data transmission mode as a second data transmission mode in response to the utilization rate being not larger than the utilization rate threshold.

10. The method as claimed in claim 2, wherein the communication channels further comprise a third communication channel; and wherein before the acquiring a current data transmission mode, the method further comprises:
  acquiring the third communication channel from the communication channels as the target communication channel in response to the to-be-transmitted data being state-type data; and
  performing the acquiring a current data transmission mode in response to the to-be-transmitted data being non-state-type data.

11. The method as claimed in claim 10, wherein the third communication channel comprises a third route configured to request work state of the second core and register state of the second core by the first core, and a fourth route configured to output log data to the first core by the second core.

12. An electronic assembly, comprising:
  a first core, a second core, and a plurality of communication channels defined between the first core and the second core, each of the plurality of communication channels having a communication performance different from each other, the plurality of communication channels being implemented based on different communication protocols, and the first core being configured to:
acquire a current data transmission mode;
acquire a corresponding communication channel corresponding to the to-be-transmitted data from the plurality of communication channels as a target communication channel; and
transmit the to-be-transmitted data to the second core via the target communication channel.

13. The electronic assembly as claimed in claim 12, wherein the first core is configured to:
acquire a current data transmission mode; and
determine, based on the data transmission mode, the corresponding communication channel corresponding to the to-be-transmitted data from the communication channels as a target communication channel.

14. The electronic assembly as claimed in claim 12, wherein the communication channels comprise a first communication channel and a second communication channel, and the first core is configured to:
take the first communication channel of the communication channels as the target communication channel in response to the current data transmission mode being a first data transmission mode;
acquire a data type of the to-be-transmitted data in response to the current data transmission mode being a second data transmission mode; and
determine, based on the data type, the corresponding communication channel corresponding to the to-be-transmitted data from the communication channels as a target communication channel;
wherein a data transmission rate of the first communication channel is faster than that of the second communication channel, and a transmission real-time capability of the second communication channel is better than that of the first communication channel.

15. The electronic assembly as claimed in claim 14, wherein the first core is configured to:
take the second communication channel as the target communication channel in response to the to-be-transmitted data being real-time data;
at least take the first communication channel as the target communication channel in response to the to-be-transmitted data being non-real-time data;
acquire an occupation degree of the second communication channel in response to the to-be-transmitted data being the non-real-time data;
take the first communication channel as the target communication channel in response to the occupation degree being larger than an occupation threshold;
divide the to-be-transmitted data into a first part and a second part in response to the occupation degree being not larger than the occupation threshold, wherein the first part and the second part respectively have corresponding serial numbers for reorganizing in sequence;
take the first communication channel as the target communication channel for the first part, and taking the second communication channel as the target communication channel for the second part; and configure the to-be-transmitted data in a most-forward transmission position of a sending buffer of the second communication channel for transmission in response to the to-be-transmitted data being the real-time data.

16. The electronic assembly as claimed in claim 14, wherein the first communication channel comprises data route configured to transmit data between the first core and the second core, first timing-sequence route configured to control the first core to actively send data to the second core, and second timing-sequence route configured to control the second core to actively send data to the first core.

17. The electronic assembly as claimed in claim 13, wherein the first core is configured to:
acquire a utilization rate of a sending buffer;
determine the current data transmission mode based on the utilization rate;
determine the current data transmission mode as a first data transmission mode in response to the utilization rate being larger than a utilization rate threshold; and
determine the current data transmission mode as a second data transmission mode in response to the utilization rate being not larger than the utilization rate threshold.

18. The electronic assembly as claimed in claim 12, wherein the communication channels further comprise a third communication channel, and the first core is configured to:
acquire the third communication channel from the communication channels as the target communication channel in response to the to-be-transmitted data being state-type data; and
perform the acquiring a current data transmission mode in response to the to-be-transmitted data being non-state-type data.

19. The electronic assembly as claimed in claim 18, wherein the third communication channel comprises a third route configured to request work state of the second core and register state of the second core by the first core, and a fourth route configured to output log data to the first core by the second core.

20. An electronic device, comprising:
a first core;
a second core; and
a memory;
wherein one or more programs are stored in the memory and used to be executed by the first core and the second core to perform an inter-processor communication method, and the method comprises:
acquiring to-be-transmitted data, wherein the to-be-transmitted data is data transmitted between the first core and the second core;
acquiring a corresponding communication channel corresponding to the to-be-transmitted data from a plurality of communication channels as a target communication channel, wherein each of the plurality of communication channels has a communication performance different from each other, and the plurality of communication channels being implemented based on different communication protocols; and
transmitting the to-be-transmitted data via the target communication channel.

* * * * *